United States Patent [19]
Saeki

[11] 4,429,376
[45] Jan. 31, 1984

[54] VIDEO DISC STYLUS DEFLECTOR SYSTEM

[75] Inventor: Tomoki Saeki, Yokahama, Japan

[73] Assignee: RCA Corporation, New York, N.Y.

[21] Appl. No.: 258,394

[22] Filed: Apr. 28, 1981

[51] Int. Cl.³ .......................... G11B 7/00; G11B 9/00; G11B 17/00
[52] U.S. Cl. ...................................... 369/43; 369/126; 369/251
[58] Field of Search ................. 369/43, 126, 170, 173, 369/251

[56] References Cited
U.S. PATENT DOCUMENTS

| | | | |
|---|---|---|---|
| 3,830,505 | 8/1974 | Rabinow | 369/251 X |
| 3,963,861 | 6/1976 | Crooks | 178/6.6 |
| 3,973,080 | 8/1976 | Dickopp et al. | 178/6.6 |
| 3,993,863 | 11/1976 | Leedom et al. | 178/6.6 |
| 4,030,123 | 1/1977 | Taylor et al. | 358/128 |
| 4,138,121 | 2/1979 | Nakajima et al. | 369/251 X |
| 4,164,756 | 8/1979 | Toda et al. | 358/128 |
| 4,170,362 | 10/1979 | Zwicky et al. | 369/251 |
| 4,183,059 | 1/1980 | Palmer | 358/128 |
| 4,262,174 | 4/1981 | Bleazey | 369/221 |
| 4,280,024 | 7/1981 | Dholakia | 369/126 X |
| 4,301,528 | 11/1981 | Leri | 369/251 X |
| 4,340,956 | 7/1982 | Miller | 369/251 X |

OTHER PUBLICATIONS

U.S. Ser. No. 39,358, filed 5/15/79, Simshauser, "Track Skipper Apparatus for Video Disc Player".

Primary Examiner—Aristotelis M. Psitos
Attorney, Agent, or Firm—E. M. Whitacre; J. S. Tripoli; E. P. Herrmann

[57] ABSTRACT

A video disc player apparatus having a signal pickup stylus secured to a stylus arm for recovering recorded signal from a disc record, wherein the stylus arm is mechanically biased by a spring force to produce a positive stylus-disc pressure, includes apparatus cooperating with the stylus arm to maintain the stylus-disc pressure generally constant in the presence of stylus-disc displacements normal to the disc surface. A permanent magnet is secured to the stylus arm with its interpolar axis transverse to the stylus arm and substantially parallel to the disc record. First and second coils, coaxially aligned are disposed on either side of the magnet and arranged with their axes parallel to the interpolar axis of the magnet. Energizing currents are applied to the first and second coils creating respective magnetic fields which produce forces repulsive to the pole of the permanent magnet proximate thereto. The location of the permanent magnet with respect to the coil axis is arranged so that a component of the repulsive force tends to counteract changes in stylus-disc pressure due to displacements of the stylus arm in a direction normal to the disc record.

10 Claims, 9 Drawing Figures (a)

(b)

VIDEO DISC STYLUS DEFLECTOR SYSTEM

This invention relates generally to apparatus for imparting selective radial translations to a video disc signal pickup stylus. More particularly, it relates to a stylus arm assembly having a piezoelectric transducer integrally mounted therewith to impart deflection to a free end of the stylus arm and a magnetic assembly cooperating with the stylus arm to maintain the pressure between the pickup stylus and the disc substantially constant and thereby enhance the performance of the transducer.

BACKGROUND OF THE INVENTION

Certain types of video disc systems utilize disc records wherein information is prerecorded by means of geometric variations in tracks or grooves proximate the surface of the disc. The information is reproduced by means of a signal pickup stylus which engages the track or groove and detects the geometric variations representative of the prerecorded signal. In the capacitance type systems the stylus-record interaction operates to form a time varying capacitance as the geometric variations in a particular track are moved past the stylus by the rotation of the disc, which time varying capacitance forms part of a tuned circuit to amplitude modulate a carrier frequency. The amplitude modulation is thereafter detected and converted to video and audio signals suitable for reproduction on standard television receivers. In the pressure sensitive systems, geometric variations in the groove apply a time varying force to the stylus which is mechanically coupled to a pressure sensitive transducer for conversion to electrical signals.

Video disc systems of this type typically employ disc records having track or groove densities of 6,000 to 10,000 per inch. As a result of such high groove densities, it is difficult to reliably translate the stylus radially across the disc in accordance with normal play. Therefore, the signal pickup stylus is mounted in a carriage assembly driven by motive means for translating the stylus radially across the disc generally synchronously with the rotation of the disc. Because the tracks tend to be slightly eccentric the stylus is mounted within the carriage for limited radial movement of the stylus with respect to the carriage. Such relative movement mechanically biases the stylus mounting arm from its home position and undesirably affects stylus tracking. In order to compensate for this condition, the relative stylus position with respect to the carriage assembly is monitored, and the carriage translation is controlled to maintain the stylus mounting arm in a generally unbiased condition and the stylus centered over the track.

The stylus mounting arm or stylus arm is typically a slender, longitudinal member oriented substantially tangent to the information track currently being played, at the point where the pickup stylus interacts with the track. One end of the stylus arm is compliantly mounted within the carriage to permit lateral and vertical pivotal movement. The pickup stylus mounted to the other end of the stylus arm can thereby track disc eccentricities without leaving the information track.

As is readily imagined, the relatively small track dimensions coupled with the relatively large size of the playback apparatus, i.e., the signal pickup stylus assembly and the carriage assembly, requires that the mechanical dynamics of the system be finely tuned. To insure that during playback the pickup stylus does not easily become disengaged from the track, a positive pressure is provided between the pickup stylus and the record disc. This pressure arises from the weight of the pickup stylus-stylus arm assembly and from the spring forces of a resilient flylead arranged in a prescribed deformation for producing such forces substantially normal to the record disc. The pressure should not be so large as to induce significant stylus or disc record wear, but should be large enough to maintain the stylus and disc in continuous contact to preclude undesirable stylus-disc capacitance variations. The flylead performs the additional function of making electrical connection between the signal pickup stylus and the player electronics. See U.S. Pat. No. 4,030,123 issued to B. K. Taylor and entitled "Stylus Adjustment Apparatus for a Video Disc Player", for an example of a stylus/stylus arm mounting arrangement.

In order to incorporate special effects options in the player, it is desirable to provide a mechanism for selectively steering the stylus to particular tracks very rapidly, e.g., to radially deflect the stylus a particular number of information tracks during the vertical blanking interval of the video signal. A stylus deflection of one track outwardly per disc rotation will provide quasi-stop motion and a one track deflection inwardly per disc rotation will produce a display which appears to be twice normal speed, etc. Prior art players have included magnetic or piezoelectric transducers cooperating with the stylus arm to provide such stylus deflection. U.S. Pat. Nos. 3,963,861; 3,993,863; and 4,164,756 show video disc players having stylus deflector transducers comprising bimorphs which are integral with the respective stylus arms. These devices, however, fail to include means for insuring a prescribed minimum disc-stylus pressure. To this end a leaf spring is incorporated between the stylus arm and the carriage. One consequence of incorporating a leaf spring however is that disc warpage will tend to create vertical translations in the stylus arm varying the elastic deformation of the spring and thereby the stylus-disc pressure created by the spring. It is evident that a stylus engaging a groove becomes more difficult to dislodge as the pressure exerted by the leafspring increases. Considering that the deflector energization pulses will be of nominal or constant amplitude, the amount of lateral deflection will be related to the stylus-disc pressure and can be somewhat unpredictable for discs having significant warpage causing variations in disc-stylus pressure.

Typical of magnetic stylus deflection transducers are U.S. Pat. No. 4,183,059, Copending Applications Ser. No. 039,358 filed June 15, 1979 and Ser. No. 039,359 filed June 15, 1979 (now U.S. Pat. Nos. 4,258,233 and 4,262,174 respectively) and U.S. Pat. No. 3,973,080. Each of these references show respective stylus arms having a permanent magnet secured thereto with electromagnetic coils secured to the carriage apparatus and proximate the permanent magnet so that selective energization of the coil will create a lateral or radially directed magnetic flux to act on the permanent magnet and deflect the stylus arm. The performance of the magnetically coupled transducers tend to be less predictable than direct coupled piezoelectrics whether or not a damper or leafspring is employed. However, when a leafspring or damper is utilized with the magnetic transducer it decreases the predictability of performance when a warped record is played.

BRIEF SUMMARY OF THE INVENTION

The present invention incorporates a piezoelectric transducer integral with the stylus arm which is compliantly mounted in the arm carriage. The piezoelectric transducer is selectively energized to perform accurate stylus deflections over small numbers of tracks. A magnetic transducer comprising a permanent magnet secured transversely to the stylus arm and disposed between a pair of electromagnetic coils mounted to the arm carriage is employed to effect gross stylus translations. A leafspring flylead is incorporated between the stylus arm and the arm carriage to create a positive pressure between the pickup stylus and the disc record, and means are provided to apply a dc current to the coils in such a fashion that each coil establishes a magnetic field repulsive to the respective pole of the permanent magnet nearest that coil, thereby generating a force on the stylus arm tending to cancel the force of the leafspring with the result that the stylus-disc pressure remains constant despite disc warpage.

DETAILED DESCRIPTION OF THE INVENTION

Figure 1:
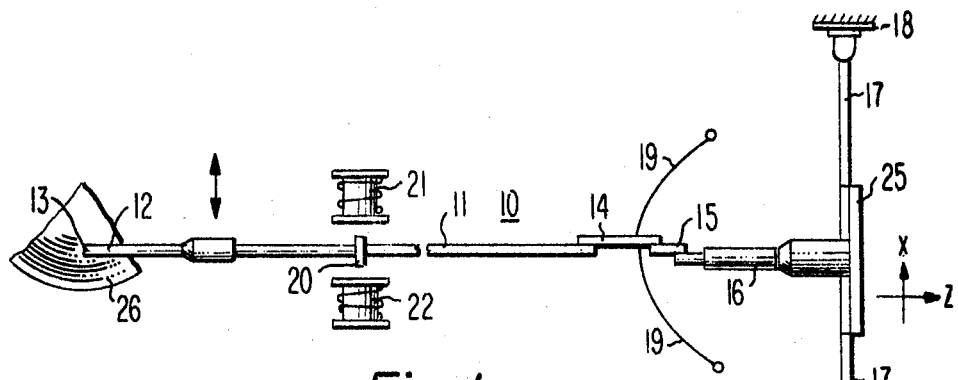
FIGS. 1 and 2 are top and side view, respectively, of a stylus arm embodying the present invention.
Figure 2:
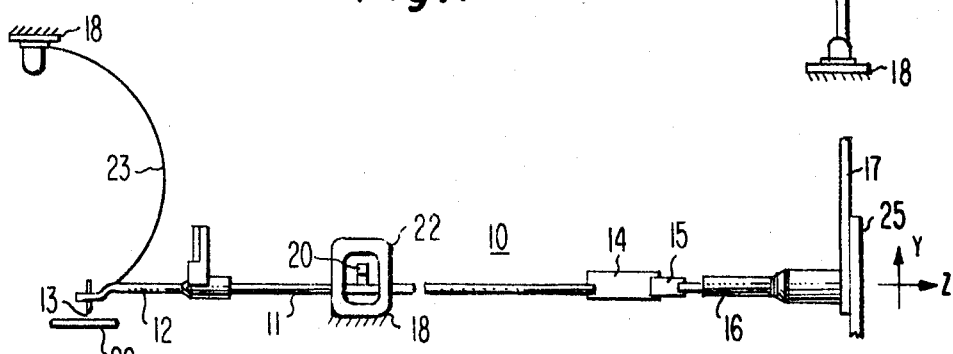

Referring to the drawings, FIGS. 1 and 2 show one particular video disc stylus arm incorporating both a piezoelectric 14 and a magnetic 22 deflection transducer. The composite stylus arm 10 and the electromagnetic coils 21 and 22 are mounted in a support structure 18 to maintain their relative spatial relationship. Support structure 18 may be the aforementioned arm carriage or a stylus cartridge removably mounted in the arm carriage or a combination of both.

In the drawings, a signal pickup stylus 13 fixed to a stylus holder 12 is secured to one end of a substantially rigid longitudinal stylus arm 11. Typically, the stylus holder 12 is a plastic member and the stylus arm 11 is a lightweight metal tube, e.g., aluminum. The other end of the stylus arm 11 is fixedly secured generally coaxially to a first end of a generally longitudinal piezoelectric transducer or bimorph 14. The stylus arm 11 and bimorph 14 are arranged such that application of energizing potential to the bimorph (via connections 19) will tend to cause the stylus to move in the direction designated "x" in the drawing. The second end of the bimorph is attached to a flexible member 15, which in turn is fixed to a compliant coupling 16. Coupling 16 is secured to a mounting plate 25 which is mounted in turn to the diaphragm 17 secured to the carriage 18.

The diaphragm 17 comprises two elastic bands stretched between the carriage mounting structures 18. This arrangement permits limited translation of the composite stylus arm in the direction designated "z" to effect stylus velocity correction by additional apparatus not shown. The compliant coupling 16 is typically a soft elastomer such as butyl rubber and permits the stylus arm to pivot thereabout in at least the "x" and "y" directions. Flexible member 15, is composed of a spring material, of either polymer or metal composition, and forms a joint permitting the composite stylus arm to bend about an imaginary "y" axis for reasons to be explicated later. In certain configurations, flexible member 15 may be eliminated.

Pickup stylus 13 engages the disc record 26 by vertical translation in the "y" direction imparted by a lifter/lowerer mechanism (not shown). A leafspring (flylead) 23 secured between the carriage structure 18 and the stylus holder 12, and arranged in an elastic arc of deformation, applies pressure to the stylus to insure continuous stylus-disc engagement. However, typical of such leafspring arrangements, the stylus-disc interactive pressure varies in a complex non-linear relation with respect to vertical displacement of the stylus (caused by disc warpage, for example). The stylus-disc pressure directly affects the amount of lateral ("x" directed) force required to radially translate the stylus.

A permanent magnet 20 is securely mounted to the stylus arm 11 with its interpolar axis transverse to the longitudinal axis of the stylus arm and parallel to the plane of the disc record. First and second axially aligned coils 21 and 22 are disposed on either side of the permanent magnet 20 and secured to the carriage structure. The coils and permanent magnet have their respective polar axes in substantially parallel alignment when the stylus is in the nominal play position. It should readily be appreciated that selective energization of the coils 21, 22 can be effected to influence the permanent magnet and radially deflect the stylus arm (see, for example, U.S. Pat. No. 4,185,059).

Figure 3:
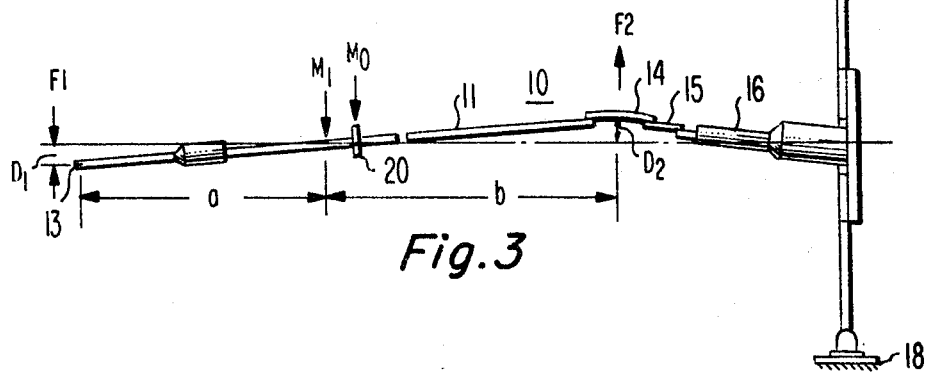
FIG. 3 is a top view of the FIG. 1 stylus arm with the piezoelectric transducer energized.

The present inventor has found that if the coils are energized with a dc current so that the magnetic field in each coil is directed to create a repulsive force on the pole of the permanent magnet respectively proximate thereto, then the permanent magnet and that portion of the stylus arm to which it is fixed will be held in a generally fixed lateral (x directed) relationship with respect to the carriage support structure. Thus, if an end of the stylus arm undergoes a small lateral translation, the permanent magnet will act as a fulcrum about which it will rotate. Since this fulcrum is fixed in space, a translation of the rightmost end of stylus arm 11 created by a controlled bending of bimorph 14 will produce a predictable translation of the pickup stylus 13 secured to the other end of the stylus arm, see FIG. 3. Note that without a fixed fulcrum, the axis about which the stylus arm will rotate will vary as the stylus-disc pressure varies. This phenomenon is true in the present case also but not to a significant degree. In addition, the axis of rotation tends not to be precisely at the position of the magnet $M_0$ but advanced slightly toward the stylus to point $M_1$.

Figure 4:
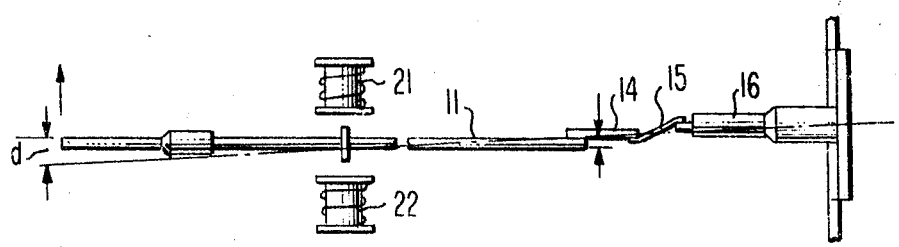
FIG. 4 is a top view of the FIG. 1 stylus arm in a condition of deflection due to track eccentricity.

A translation of the stylus end of the stylus arm due to a stylus tracking an eccentric groove will also tend to impart a rotation of the stylus arm about an imaginary vertical axis (fulcrum) located at the magnet. The second end of the stylus arm will undergo displacement due to the compliance of coupler 16 (FIG. 4). The flexible member 15 is included to afford greater ease of such displacement by effectively functioning as a hinge to a limited degree. Without the flexible member 15, lateral displacement of the stylus end of the stylus arm due to lateral forces acting between the disc and stylus would tend to displace the lateral position of the permanent magnet and reduce the predictability of a concurrent bimorph induced lateral stylus deflection. The flexible member 15 decreases the resistance of the second end of the stylus arm to lateral motion thereby tending to maintain the axis of stylus arm rotation substantially fixed and improving the overall performance of the system.

The stylus translation induced by application of an energizing potential to the piezoelectric transducer 14 is related to the arc of deformation created in the transducer by the amplitude and polarity of the energizing potential. The bending deformation potential relationships are well documented in the piezoelectric transducer arts and will not be explicated here. The arc of deformation produced in the transducer determines the lateral displacement, D2, of the secured end of the composite stylus arm 10. The deflection imparted to the stylus, D1, is determined by the ratio of the distances from the respective ends of the stylus arm to the axis of rotation or fulcrum at M1, i.e., $D1 = D2 \times (a/b)$, where $a$ and $b$ are the relative distances between the stylus and the fulcrum and between the piezoelectric transducer and the fulcrum M1, respectively. The lateral force, F1, available at the stylus for translating the stylus, is equal to the force, F2, produced by the transducer times the inverse proportion of the lever arms, i.e., $F1 = F2 \times (b/a)$. Locating the magnet and thereby the fulcrum nearer the stylus end of the composite stylus arm 10 will (a) create a mechanical advantage in favor of translating the stylus and (b) tend to enhance the predictability of the distance translated.

Figure 5:
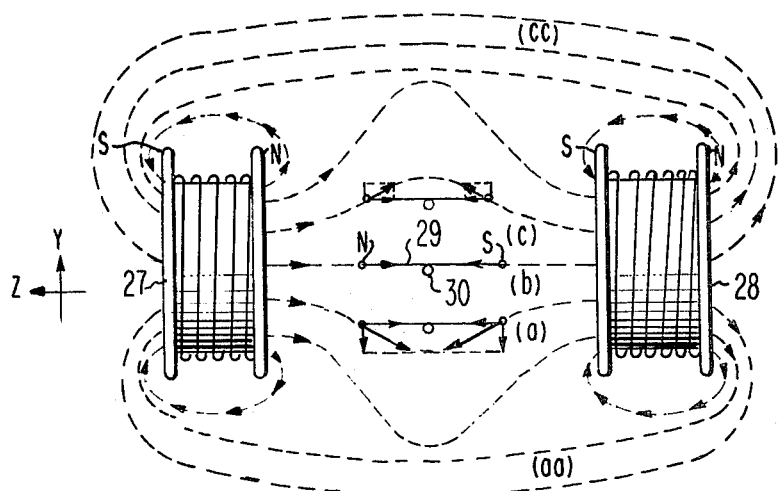
FIG. 5 is a conceptual diagram of the interaction between the permanent magnet mounted on the stylus arm and the electromagnetic coils.

The magnet-coil arrangement affects the dynamics of the system in a second desirable manner which enhances the predictability of transducer induced stylus translations. This aspect arises when a dc magnetic field is produced in the coils to produce a vertical component of force on the permanent magnet in an off axis position. Referring to FIG. 5, first and second similar coils 27 and 28 are energized to create similar magnetic fluxes with their magnetic polarities as shown. A simulated permanent magnet 29, secured to a stylus arm 30, is disposed between the coils. The broken lines simulate the disposition of magnetic flux emanating from the coils. Magnetic forces imparted between like poles are repulsive and will be directed along the flux lines. When the magnet 29 is located colinear with the axis of the coils (position b), coil 27 creates a rightward acting force on the magnet 29 which is cancelled by a leftward acting force created by coil 28. Magnet 29 is precluded from rotating in the field by being secured to the stylus arm 30. When the magnet 29 is translated vertically to positions a or c, it can be shown that a vertical component of the force exists which will tend to push the magnet outwardly away from colinear alignment with the coils. The vertical force component associated with a particular magnet-coil combination is related to the coil energizing current. The present inventor realized that the vertical component of force acting on the magnet could be used to advantage to partially cancel the forces imparted to the stylus/stylus arm by the leafspring and thereby reduce stylus-disc pressure variations. It should be appreciated that without stylus-disc pressure variations, the lateral force needed to translate the stylus a given distance will be constant and therefore once the system is calibrated, highly predictable stylus translations can be achieved.

Figure 6:
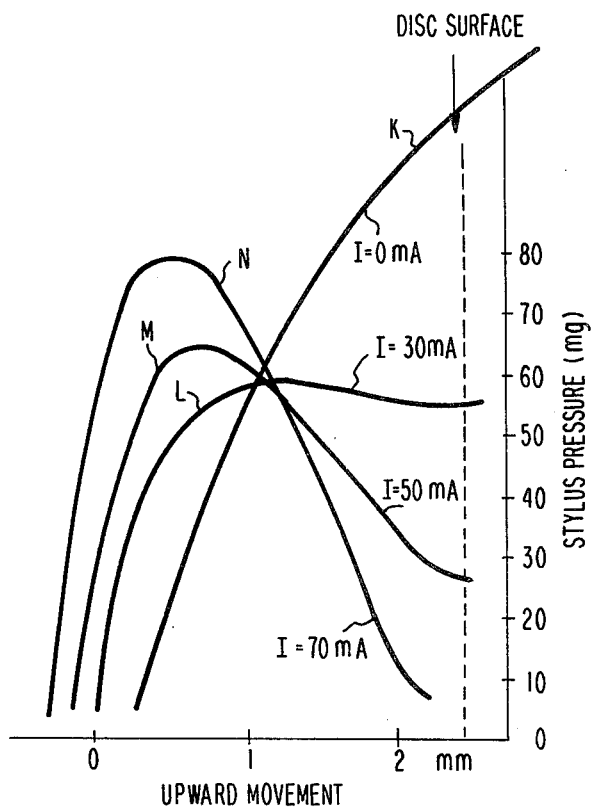
FIG. 6 is a graph of the stylus-disc pressure for selected values of coil current.

The present inventor discovered that for a particular coil energization current, the "y" directed vertical component of force on the magnet as it progresses upward away from the colinear position is similar to the non-linear force-displacement characteristic of the leafspring 23. FIG. 6 illustrates the downward pressure or force exhibited by the stylus as in FIG. 2 for one particular stylus arm system incorporating a leafspring creating downward force and a magnet-coil arrangement applying an upward force. In the figure, the zero coordinate of the abscissa corresponds to an imaginary point below the surface of the disc record, at which point the leafspring would be substantially non-deformed or relatively straight. Between coordinates 0 and 1 the stylus arm 30 and permanent magnet 29 (FIG. 5) move through the flux lines from some point (aa) through point (a) to point (b). In this region, the vertical component of force on the magnet is downward, aiding the forces created in the leafspring. As the magnet progresses upward toward position (c), i.e., rightward from the coordinate equal to 1 (approximately), the vertical force component acting on the magnet reverses direction and opposes the downward force imparted by the leafspring. The curve denoted "k" illustrates the compressive force of the leafspring acting alone on the stylus arm. Curves L, M, N show the effect imparted by the magnet for increasing coil current. It is seen that in the experimental apparatus tested, a coil current of 30 milliamperes produced a force which effectively cancelled the spring pressure above 55 milligrams over a relatively wide range of vertical stylus displacement. This is in effect the desired constant stylus-disc pressure system.

Figure 7:
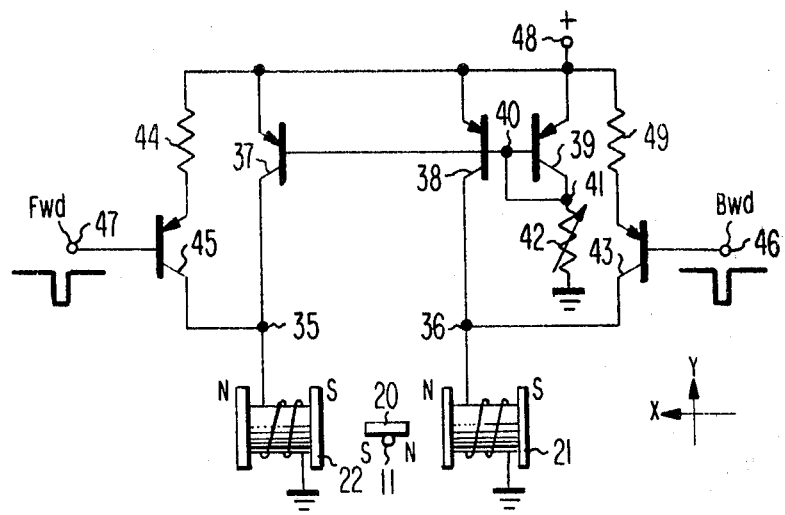
FIG. 7 is a schematic diagram of electric circuitry for energizing the electromagnetic coils.

FIG. 7 illustrates a particular circuit for applying similar dc energization currents to similar coils 21 and 22. In the figure, transistor 39 having its base electrode 40 interconnected with the base electrodes of transistors 37 and 38 and further connected at its collector electrode at 41 forms current mirrors with transistors 37 and 38. The currents conducted by the collector electrodes of transistors 37 and 38 at connections 35 and 36, respectively, are directly related to the current conducted in the collector of transistor 39, which current is established by the ohmic resistance of potentiometer 42 in the collector circuit of transistor 39. In this arrangement, if transistors 37 and 38 are selected with like operating characteristics, they will pass substantially equal collector currents.

Transistor 45 selectively energized by a negative going pulse at terminal 47 will pass a collector current to connection 35, selectively increasing the current in coil 22 and the magnetic flux generated thereby, forcing the magnet 20 rightward or forward for gross stylus translations. Similarly, transistor 43, selectively energized by a negative going potential applied at terminal 46, will increase the current in coil 21 to impart a leftward or backward translation to the stylus. Resistors 49 and 44 in the emitter circuits of transistors 43 and 45, respectively, limit the current available from the collector electrodes of those transistors.

In FIGS. 8(a) and (b) an alternate deflector assembly is shown. Elements having similar designation numerals to elements in FIGS. 1–4 are presumed to be structurally and functionally similar. In this embodiment, the piezoelectric or bimorph transducer has been replaced by an electromagnetic transducer comprising the permanent magnet 54 mounted to the rightmost end of stylus arm 11 and electromagnetic coils 52 and 53 secured to the carriage 18. The coils 52 and 53 are selectively energized to impart magnetic force to the magnet 54 and thereby translate the magnet 54 in the "x" direction. Consequently, the stylus arm 11 will rotate about a fulcrum established by magnet 20 and cause an "x" directed translation of the stylus 13 in a direction opposite the motion of magnet 54.

A flexible tubular section 51 comprising an elastomer such as butyl rubber is a substitute for the leafspring 23. Tubular section 51 applies a mechanical bias to the stylus arm 11 to create desired stylus-disc interface pressure to insure that the stylus engages the disc continuously.

Figure 8:
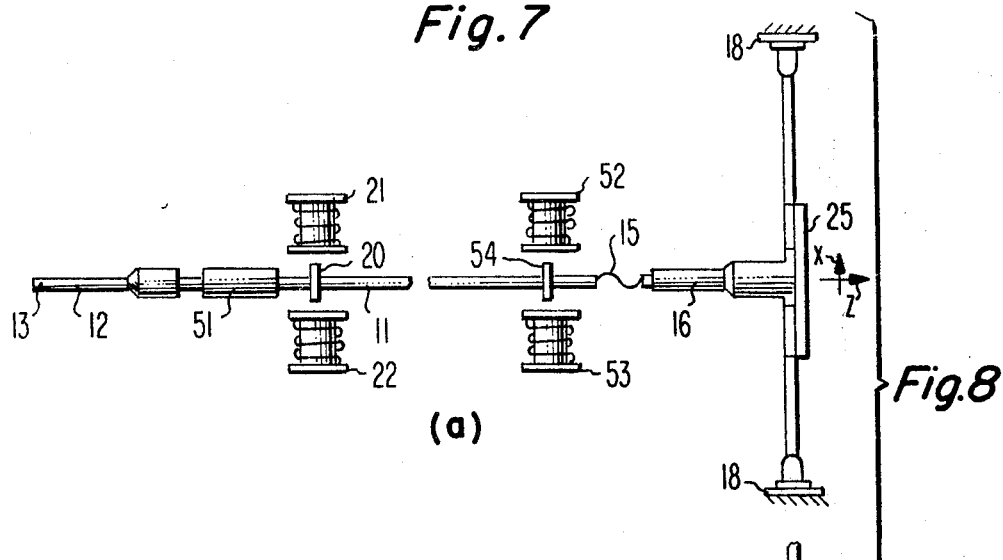
FIGS. 8(a) and (b) are top and side views, respectively, of a second stylus arm embodiment of the present invention.
Figure 8:
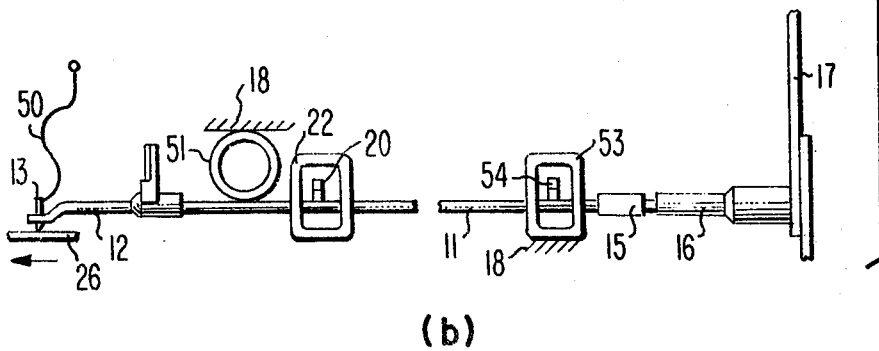

In the FIG. 8 embodiment, electrical connection to the signal pickup stylus 13 is made via a thin conductive filament 50. This function is performed by the flylead 23 in the FIGS. 1-4 embodiment.

I claim:

1. In a video disc playback system including a base for rotatably supporting a disc record and a carriage system for supporting and translating a signal pickup stylus radially across the disc in consonance with the desired speed of signal recover, an improved stylus deflector apparatus comprising:
    a stylus arm having the signal pickup stylus secured to a first end thereof and having a second end;
    a compliant coupler for securing the second end of the stylus arm to the carriage to permit pivotal motion of the stylus arm and engagement of the signal pickup stylus with the disc record;
    a first electromechanical transducer connected proximate the second end of the stylus arm for producing controlled translations of the pickup stylus in a direction radially across the disc record;
    a mechanical bias means connected between the carriage and the stylus arm proximate the first end thereof for providing a positive disc-stylus pressure;
    a permanent magnet secured to the stylus arm having its interpolar axis transverse to the stylus arm and substantially parallel to the record surface during normal playback;
    first and second electromagnetic coils coaxially aligned and secured to the carriage so that the permanent magnet is disposed therebetween with its interpolar axis parallel with the axis of the coils, and said permanent magnet being offset from the coil axes in a direction substantially normal to said disc record, in the normal playback position;
    means for energizing the first and second coils with a substantially constant current component to create a magnetic field therebetween imparting a force on the permanent magnet in a direction normal to the disc record, said force tending to counteract bias variations produced by said mechanical bias means during disc playback and thereby tending to maintain said disc-stylus pressure constant.

2. A stylus/stylus arm apparatus for a disc record playback system comprising:
    a rigid, longitudinal stylus arm having a signal pickup stylus secured to a first end thereof;
    a piezoelectric transducer secured at a first end thereof to a second end of said stylus arm, having control signal input terminals and having a second end, said transducer being arranged for translating said pickup stylus radially across a disc record responsive to signal applied to said control terminals;
    a support structure for supporting the stylus arm in a desired spatial relation to said disc record;
    a compliant coupler mounted in said support structure and having the second end of the piezoelectric transducer secured thereto, said compliant coupler permitting pivotal motion of the stylus arm;
    mechanical bias means connected between the support structure and the stylus arm proximate the first end of the stylus arm for imparting a force thereto in a direction substantially normal to the disc record when the stylus is in a play position;
    a permanent magnet secured to the stylus arm with its interpolar axis transverse to the stylus arm and substantially parallel to the plane of the disc record;
    first and second similar electrical coils coaxially aligned and secured to the support structure, said coils arranged so that said permanent magnet is disposed therebetween with the interpolar axis of the permanent magnet substantially parallel to the axis of the coils but displaced therefrom in the normal playback position in the direction away from the disc record;
    means for energizing said first and second coils with substantially constant current components of like amplitude and poled so that the magnetic fields generated respectively therein will tend to repel the pole of the permanent magnet most proximate thereto, the interaction of said fields with the permanent magnet tending to counteract force variations normal to said disc produced by said mechanical bias means during disc playback, and forming a fulcrum for rotation of the stylus arm in a plane parallel to the disc record.

3. The apparatus set forth in claim 2 including a flexible member interposed between said compliant coupler and said piezoelectric transducer, said flexible member permitting bending of the stylus arm-transducer-flexible member combination in a direction laterally across said disc record and not in a direction normal to said disc record.

4. The apparatus set forth in claim 1, or 2, or 3 wherein the mechanical bias means comprises a leafspring deformed in an arc between the support structure and the stylus arm.

5. The apparatus set forth in claims 2 or 3 wherein said compliant member is secured to the support structure by an elastic diaphragm arranged to permit limited motion of the stylus arm along its longitudinal axis.

6. The apparatus set forth in claim 1 or 2 further including means for selectively applying energizing currents to said first and second coils for impart generating a magnetic field therebetween to a translatory force to the permanent magnet to deflect the pickup stylus radially across said disc record.

7. In a video disc player for recovering recorded signal from a disc record, said player including a base for rotatably supporting said disc and a carriage for supporting a signal recovery stylus in a prescribed relation to said disc, the combination comprising:
    a stylus arm having said recovery stylus secured to a first end thereof and having a second end compliantly secured to said carriage;

mechanical bias means connected between said carriage and the stylus arm proximate the first end thereof for establishing a force between the recovery stylus and the disc record, said mechanical bias means characterized by producing an increasingly greater force for stylus-disc translation in a direction normally away from said base due to disc warpage;

a permanent magnet secured to the stylus arm having its interpolar axis transverse to the stylus arm and substantially parallel to the record surface during normal playback;

first and second electromagnetic coils coaxially aligned and secured to the carriage so that the permanent magnet is disposed therebetween with its interpolar axis parallel with the axis of the coils, and said permanent magnet being offset from the coil axes in a direction generally normal to said disc record, in the normal playback position;

means for energizing the first and second coils with a substantially constant current component to create a magnetic field therebetween, said field imparting a force on the permanent magnet in a direction normal to the disc record, said force tending to counteract bias variations produced by said mechanical bias means during disc playback.

8. The combination set forth in claim 7 further including a deflection transducer coupled to said stylus arm for selectively translating said stylus in a direction radially across said disc record.

9. The combination set forth in claim 7 wherein the deflection transducer comprises a bimorph integral to the stylus arm located proximate said second end.

10. The combination set forth in claim 7 or 8 or 9 wherein the mechanical bias means comprises a leaf-spring elastically deformed in an arc for producing compressive force when the stylus engages said disc record.

* * * * *